United States Patent
Palmer et al.

(10) Patent No.: US 10,558,512 B2
(45) Date of Patent: Feb. 11, 2020

(54) BALLAST WATER TANK RECIRCULATION TREATMENT SYSTEM

(71) Applicant: XYLEM IP HOLDINGS LLC, White Plains, NY (US)

(72) Inventors: David S. Palmer, Much Hadham (GB); Robert M. Ellison, Jamaica Plain, MA (US)

(73) Assignee: Xylem IP Holdings LLC, Rye Brook, NY (US)

( * ) Notice: Subject to any disclaimer, the term of this patent is extended or adjusted under 35 U.S.C. 154(b) by 447 days.

(21) Appl. No.: 14/176,474

(22) Filed: Feb. 10, 2014

(65) Prior Publication Data

US 2014/0224714 A1 Aug. 14, 2014

Related U.S. Application Data

(60) Provisional application No. 61/762,420, filed on Feb. 8, 2013.

(51) Int. Cl.
*G06F 11/07* (2006.01)
*B63J 4/00* (2006.01)
(Continued)

(52) U.S. Cl.
CPC .............. *G06F 11/079* (2013.01); *B63J 4/002* (2013.01); *C02F 1/008* (2013.01); *C02F 1/325* (2013.01);
(Continued)

(58) Field of Classification Search
CPC .... G06F 11/079; G06F 11/0721; C02F 1/325; C02F 1/008; C02F 1/001;
(Continued)

(56) References Cited

U.S. PATENT DOCUMENTS 3,155,609 A 11/1964 Pampel
4,298,467 A 11/1981 Gartner et al.
(Continued)

FOREIGN PATENT DOCUMENTS

CN 201545720 8/2010
DE 102006045558 4/2008
(Continued)

*Primary Examiner* — Lucas A Stelling
*Assistant Examiner* — Angel Olivera
(74) *Attorney, Agent, or Firm* — Ware, Fressola, Maguire & Barber LLP

(57) ABSTRACT

Apparatus is provided having a signal processor or signal processing module configured to receive signaling containing information about the quality of water in a ballast water tank recirculation treatment system, e.g., in a vessel, boat or ship; and determine information about a variable fluorescence treatment to the water in the ballast water tank recirculation treatment system, based at least partly on the signaling received, as well as provide corresponding signaling containing information about the variable fluorescence treatment. The apparatus may include a variable fluorescence device configured to receive the corresponding signaling and provide the variable fluorescence treatment, including providing ultraviolet (UV) light to the water in the ballast water tank recirculation treatment system.

9 Claims, 9 Drawing Sheets

(51) Int. Cl.
*C02F 1/32* (2006.01)
*C02F 1/00* (2006.01)
*C02F 103/00* (2006.01)
*C02F 103/08* (2006.01)
*G06N 5/04* (2006.01)

(52) U.S. Cl.
CPC ........... *G06F 11/0721* (2013.01); *G06N 5/04* (2013.01); *C02F 1/001* (2013.01); *C02F 2103/008* (2013.01); *C02F 2103/08* (2013.01); *C02F 2201/326* (2013.01); *C02F 2209/005* (2013.01); *C02F 2209/02* (2013.01); *C02F 2209/06* (2013.01); *C02F 2209/11* (2013.01); *Y02T 70/36* (2013.01); *Y02T 70/70* (2013.01)

(58) Field of Classification Search
CPC ............ C02F 2209/005; C02F 2209/02; C02F 2209/06; C02F 2209/11; C02F 2201/326; C02F 2103/008; C02F 2103/08; G06N 5/04; B63J 4/002; Y02T 70/36; Y02T 70/70
See application file for complete search history.

(56) References Cited

U.S. PATENT DOCUMENTS

| | | | |
|---|---|---|---|
| 4,752,401 A | 6/1988 | Bodenstein | |
| 4,992,380 A | 2/1991 | Moriarty et al. | |
| 5,322,569 A | 6/1994 | Titus et al. | |
| 5,411,889 A | 5/1995 | Hoots et al. | |
| 5,506,096 A | 4/1996 | Helmo | |
| 5,700,370 A | 12/1997 | Helmo | |
| 5,702,684 A | 12/1997 | McCoy et al. | |
| 5,906,746 A | 5/1999 | Helmo et al. | |
| 5,948,272 A | 9/1999 | Lemelson | |
| 6,403,030 B1 | 6/2002 | Horton, III | |
| 6,500,345 B2 | 12/2002 | Constantine et al. | |
| RE38,130 E | 6/2003 | Adams | |
| 6,830,699 B2 | 12/2004 | Heidal et al. | |
| 6,921,476 B2 | 7/2005 | Abe et al. | |
| 6,972,415 B2 | 12/2005 | Schaible et al. | |
| 7,025,889 B2 | 4/2006 | Brodie | |
| 7,160,370 B2 | 1/2007 | Baca et al. | |
| 7,585,416 B2 | 9/2009 | Ranade et al. | |
| 7,595,003 B2 | 9/2009 | Maddox | |
| 7,618,536 B2 | 11/2009 | Haeffner et al. | |
| 7,815,810 B2 | 10/2010 | Bhalchandra et al. | |
| 7,820,038 B2 | 10/2010 | Abe et al. | |
| 8,211,317 B2 | 7/2012 | Nguyen et al. | |
| 8,324,595 B2 | 12/2012 | Takahashi et al. | |
| 2004/0061069 A1 | 4/2004 | Schaible et al. | |
| 2004/0134861 A1* | 7/2004 | Brodie | B63B 17/00 210/748.11 |
| 2007/0136834 A1* | 6/2007 | Greenbaum | C12Q 1/02 800/278 |
| 2008/0093225 A1* | 4/2008 | Cline | C02F 1/467 205/687 |
| 2008/0206095 A1 | 8/2008 | Duthie | |
| 2008/0240997 A1 | 10/2008 | Kaiga et al. | |
| 2009/0321365 A1 | 12/2009 | Eriksson et al. | |
| 2010/0116647 A1 | 5/2010 | Kornmuller et al. | |
| 2011/0076188 A1 | 3/2011 | Sief et al. | |
| 2011/0278467 A1 | 11/2011 | Tanaka | |
| 2012/0279920 A1 | 11/2012 | Conner et al. | |
| 2012/0312757 A1 | 12/2012 | Ueyama et al. | |

FOREIGN PATENT DOCUMENTS

| | | |
|---|---|---|
| EP | 2394963 | 12/2011 |
| GB | 1467312 | 3/1977 |
| JP | 2001047040 | 2/2001 |
| JP | 2002263645 | 9/2002 |
| JP | 2004188273 | 7/2004 |
| JP | 2004243265 | 9/2004 |
| JP | 2009103479 | 5/2009 |
| WO | 9857153 | 12/1998 |
| WO | 2006068979 | 6/2006 |
| WO | 2010093796 | 8/2010 |
| WO | 2011049546 | 4/2011 |
| WO | 2011055133 | 5/2011 |

* cited by examiner

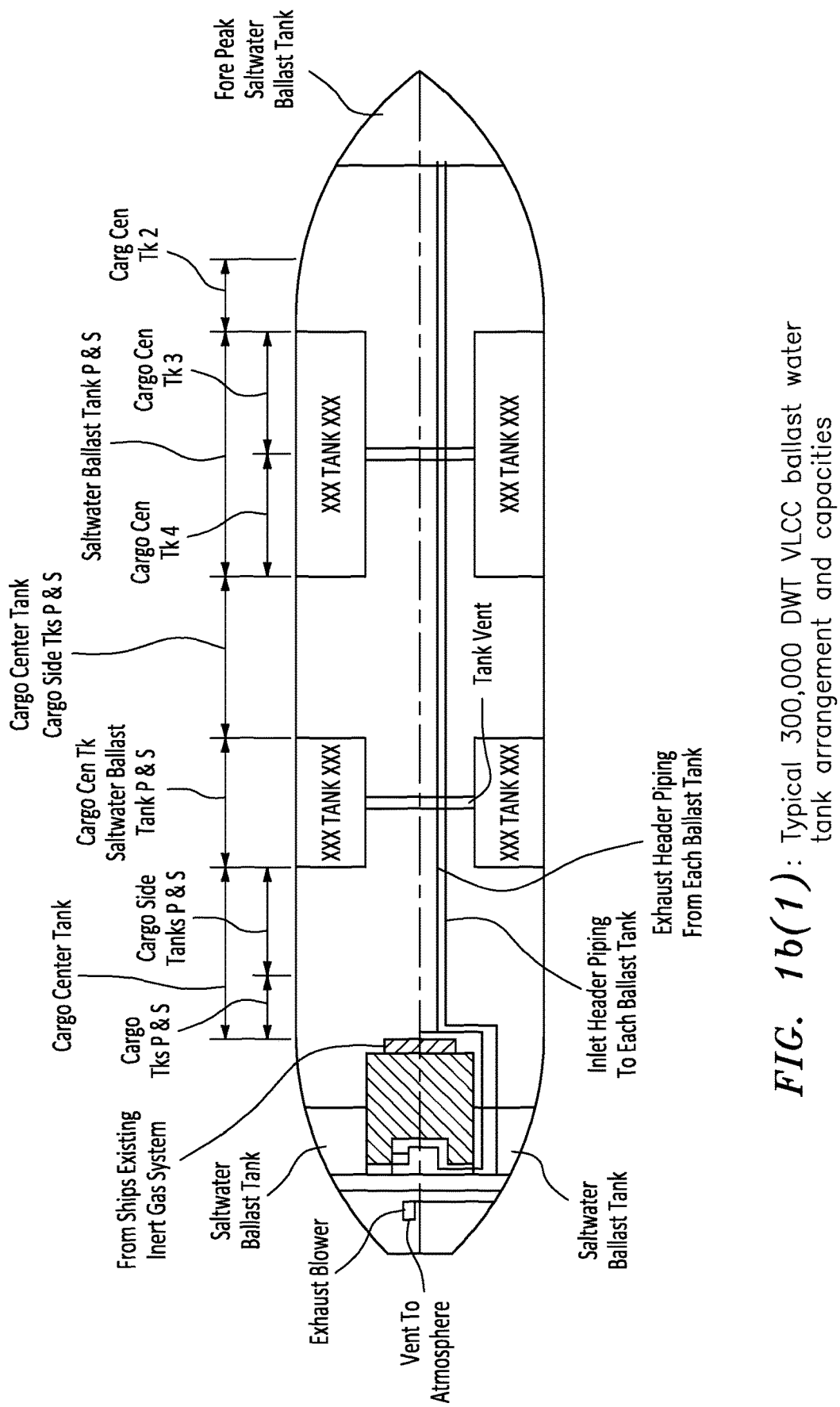
FIG. 1b(1): Typical 300,000 DWT VLCC ballast water tank arrangement and capacities

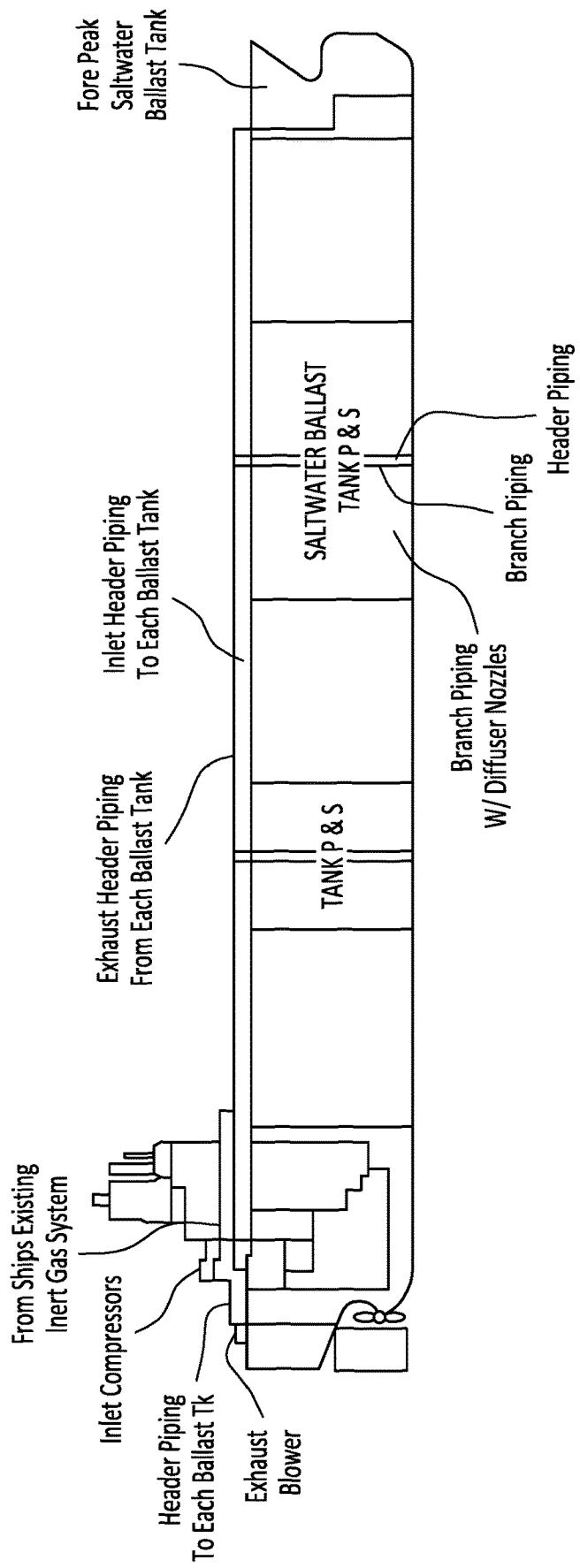
FIG. 1b(2): Typical 300,000 DWT VLCC ballast water tank arrangement and capacities

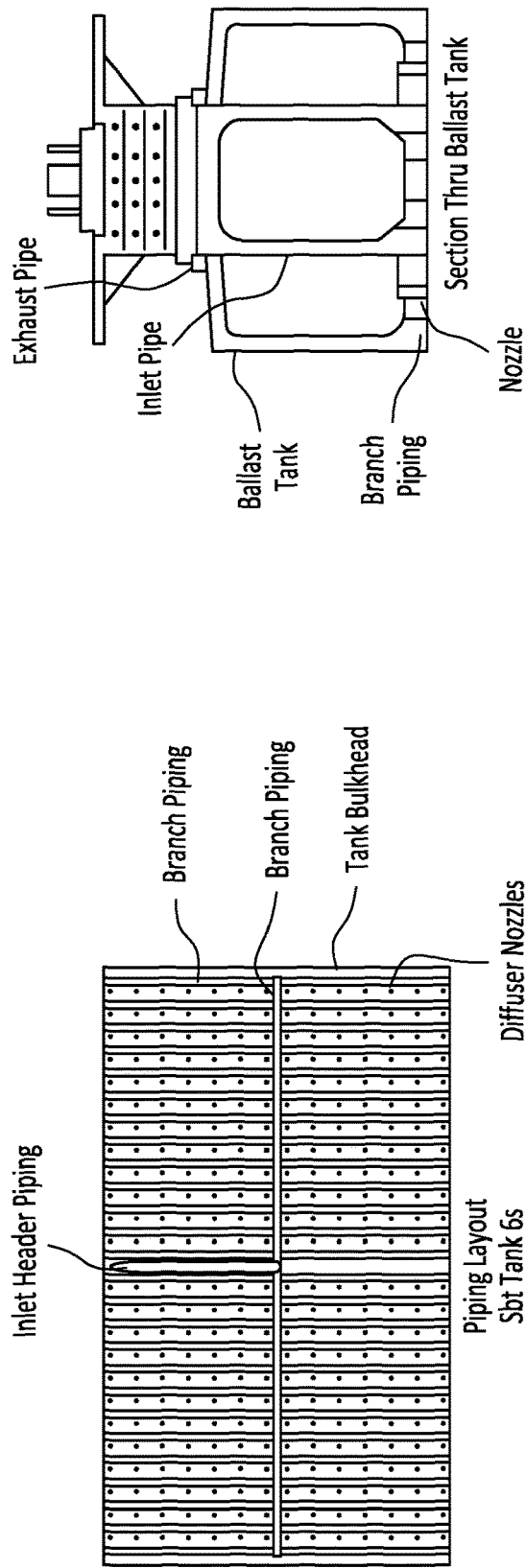
FIG. 1b(3): Typical 300,000 DWT VLCC ballast water tank arrangement and capacities
FIG. 1b(5): Typical 300,000 DWT VLCC ballast water tank arrangement and capacities
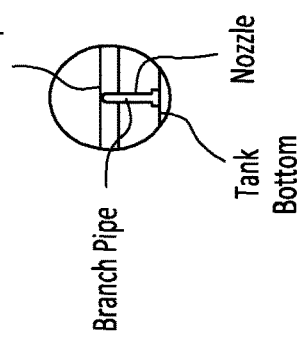
FIG. 1b(4): Typical 300,000 DWT VLCC ballast water tank arrangement and capacities

Example flow requirements of a recirc. system

The below table is only for example purposes and the assumptions made regarding treatment time and tank recirculation are not verified

| Assuming 5 day treatment time - tank volumes recirculated 3 times | | | | |
|---|---|---|---|---|
| Tank | Volume (m3) | Volume treated (m3) | Time taken (hrs) | Flow required (m3/hr) |
| Force Peak | 8265 | 24795 | 120 | 207 |
| B3S | 32200 | 96600 | 120 | 805 |
| B3P | 32200 | 96600 | 120 | 805 |
| B6S | 16048 | 48144 | 120 | 401 |
| B6P | 16048 | 48144 | 120 | 401 |
| B ER S | 1645 | 4935 | 120 | 41 |
| B ER P | 1645 | 4935 | 120 | 41 |
| Aft Peak | 2331 | 6993 | 120 | 58 |
| Total | | 331146 | | 2760 |

Treatment flow rates per tank dramatically reduced

The system is obviously flexible in being able to offer various flow rates dependent on the treatment time required but the fixed factor is of course determining the required recirculation time and piping design to achieve complete disinfection of any given tank

*FIG. 1c*

Apparatus 10

Signal processor or signal processing module 10a configured at least to receive signaling containing information about the quality of water in a ballast water tank recirculation treatment system; and determine information about a variable fluorescence treatment to the water in the ballast water tank recirculation treatment system, based at least partly on the signaling received; and/or provide corresponding signaling containing information about the variable fluorescence treatment.

One or more other module/components 10b, including input/output components/modules, memory (RAM, ROM, etc.), data, control and address busing architecture, etc., as well as other parts and components that may form part of the ballast water tank recirculation treatment system.

*FIG. 3*

BALLAST WATER TANK RECIRCULATION TREATMENT SYSTEM

CROSS-REFERENCE TO RELATED APPLICATIONS

This application claims benefit to provisional patent application Ser. No. 61/762,420, filed 8 Feb. 2013, which is hereby incorporated by reference in its entirety.

BACKGROUND OF THE INVENTION

1. Field of the Invention

The present invention relates to a water treatment system; and more particularly relates to a water treatment system for a vessel.

2. Brief Description of Related Art

In general, some problems associated with ballast water treatment include the following:

The use of UV, Ozone and Electro Chemical type treatment systems have limiting factors by way of the size and power consumption of the plant.

The major segment of the BWTS market is the refit portion where existing machinery space and the necessary extra generating power are not readily available (all ship types).

New builds can of course have the extra space and power required by these systems to be designed in.

Currently, treatment is undertaken during ballast operation in port at high flow rates with the inherent risk of non-compliance by having only one main treatment plant—should the plant fail or water quality is worse than the plant is able to disinfect.

With cargo operations being undertaken simultaneously, this is the most stressful time for a ship's crew to be looking after an additional complex system.

By way of example, current known and available treatment technologies utilize "in-line" treatment and bulk chemical additive:

In-Line.

In-line treatment systems are in-variable coupled into the existing ship's ballast pumping systems and suffer from at least one of the following problems:

(1) Variation to the existing designed ballasting flow rate due to additional piping restrictions.
(2) Variation to flow rate due to additional components being added, e.g., UV, Ozone, and Electro Chemical reactors/injection systems.
(3) The problems encountered with systems requiring additional filtration (reduction in flow—required pressure differential for backwash, downtime due to backwash cycles).
(4) The systems are required to treat/disinfect at the same potentially high flow rates of the ship's existing ballast pumps which offers potential problems of fast changing water quality conditions (e.g. sediment may pass through filters) and change in water quality due to flotation levels of the ship (ballasting in tidal waters).
(5) Due to the varying water qualities and flow rate, disinfection techniques are not able to vary the required treatment dosing levels instantaneously to achieve compliant disinfection levels.
(6) Some treatment systems due to the by-products produced and lack of control due to flow rate may incur other associated problems (e.g., corrosion due to uncontrolled PH levels and/or high levels of unrequired toxicity).
(7) The electrical power requirements of existing disinfection systems treating very high flow rates can be prohibitive to fitting to all types of ships (especially retro-fit where existing generating capacity may be a limiting factor).

Chemical Addition.

These systems require an amount of disinfection chemicals to be added to the tank based on water volume (not on water quality). The invention is constantly monitoring disinfection levels and actual living cell count within the water to add chemicals to an absolute minimum to achieve compliant disinfection levels. Chemical addition is not normally by a recirculating method (recirculating increases mixing/dispersal within the tank for more effective).

In view of this, there is a need in the industry to enhance the current available treatment technologies that utilize the aforementioned "in-line" treatment and bulk chemical additive.

In particular, techniques for ship ballast sterilization are known in the art. By way of example, some known techniques are summarized below:

For example, U.S. Pat. No. 7,025,889 (see FIG. 7 in the '889 patent) discloses a technique for recirculation in a ballast water treatment system, consistent with that described in column 5, lines 14 through 21, which is hereby incorporated by reference in its entirety. The '889 patent does not disclose the use of an in-line VF to control the output of the UV lamp.

Further, United States Patent Publication no. US2010/0116647 discloses a ballast water treatment plant having a filter, disinfection, instrumentation and control unit, which is also hereby incorporated by reference in its entirety.

Furthermore, U.S. Pat. No. 6,773,611 discloses techniques for controlling organisms in ballast water, which is also hereby incorporated by reference in its entirety. The technique in the '611 patent is based at least partly on a chlorine dioxide biocide based system, and does not disclose the use of VF to determine the number of living organisms.

In view of this, there is a need in the industry for solutions to problems encountered in operating the system, e.g., fouling of the lamps or VF.

Moreover, the implementation of new ballast water treatment and discharge regulations by the United States Coast Guard (USCG) in 2013 and pending International Maritime Organization (IMO) regulations has created a demand of a monitoring system that can provide information on the discharge quality in real time or near real time and can be easily integrated and operating by ship technicians and engineers. There are a variety of such monitoring systems on the market or in development but none address the challenges of an ever changing water matrix that can contain a variety of interfering substances and conditions.

In view of this, there is also a need in the industry for a new technique to address the most challenging conditions that can negatively impact the variable fluorescence data quality. This need is particularly important in relation to, e.g., a ballast discharge application, due to the potentially expensive and time consuming consequences of inaccurate discharge data creating a false positive or false negative result.

SUMMARY OF THE INVENTION

The Present Invention

In general, the present invention provides an enhancement to the current available on-board water treatment technologies that utilize the aforementioned "in-line" treatment and bulk chemical additive:

In summary, the basis or thrust of the present invention is to treat the ballast water in a controlled manner to achieve the required compliance levels.

On-Passage Treatment Solution

In general, according to some embodiments of the present invention, the on-passage treatment solution may include:

One solution to the problems set forth above may be to develop completely packaged smaller treatment systems that may be fitted on deck and treat individual tanks (recirculating) at lower flow rates whilst on-passage. Note: this system may be aimed at ships having longer haul trading routes (the scope of the invention is not based on any particular estimation but is intended to be a viable option that one would expect no less than 3-5 days between ports).

Advantages of the completely packaged smaller treatment systems may include one or more of the following:

Potentially lower CAPEX for the Ship owner—several smaller treatment units will cost less than 1 large one and a simplified installation, Potentially higher OPEX due to treating a larger volume of water, No complex integration into existing ballast system, Existing ballast operations remain unchanged (flow rates/stripping/gravity etc.), No extra power demand during cargo operations, Lower flow systems will treat more efficiently and effectively, If fitted above waterline potentially low cost plastic pipework can be used, Packaged systems offer faster easier fitting avoiding potential installation mistakes, Recirculation systems can be run for longer periods if ballast water is of particularly low quality until compliance is achieved, Installed VF monitor will control and optimize the power and amount of treatment required to reach the compliance standard, Other installed sensors can monitor PH, toxicity, etc. to effect early neutralizing treatment prior to discharge and protect tanks from other potential threats (corrosion), and No need to Dry Dock vessel to install.

Suitable Treatment Options

According to some embodiments of the present invention, suitable treatment options may include one or more of the following:

1. UV
a) UV systems are simpler than Ozone/Electro Chlorination and have fewer components, and
b) UV systems may need to recirculate the water longer until treatment level is achieved.

2. Ozone
a) Ballast water in the tank can be continuously monitored for potential corrosion threats,
b) Ballast water can be monitored and neutralized (if required) prior to discharge,
c) Ozone process disinfecting by-products may reduce recirculating time (next point),
d) Disinfection process will continue in the ballast tank with better dispersion/mixing, and
e) Better controlled Ozone reaction/de-gassing chambers compared to current methods.

3. Electro Chlorination
a) Ballast water in the tank can be continuously monitored for potential corrosion threats,
b) Ballast water can be monitored and neutralized (if required) prior to discharge,
c) EC disinfection may reduce recirculating time (next point),
d) Disinfection process will continue in the ballast tank with better dispersion/mixing, and
e) Lower flow rates will assist in counter-acting measures for temperature and salinity problems.

4. Chemical Additives
a) Controlled method of introducing and mixing the additives in the ballast tank,
b) Ballast water in the tank can be continuously monitored for potential corrosion threats, and
c) Ballast water can be monitored and neutralized (if required) prior to discharge.

According to some embodiments, the present invention may be based at least partly upon (independent from the ships main ballast system) re-circulating and treating the ballast water in the tank during passage at a slower and controlled rate whereby disinfection levels are monitored and adjusted to an optimal level to not incur other normally associated problems (over disinfection, uncontrolled PH levels—corrosion, the requirement of neutralizing agents being added prior to discharge, etc.).

Each or multiple ballast tanks will each have a small recirculating treatment system that can be manually or automatically programmed to varying passage lengths/treatment times—the flow rate or treatment dosage level will be varied accordingly. The water will be recirculated (proposed suction arrangement in base of tank discharging to top of tank) through a reactor/mixing chamber where disinfection takes place.

The present invention solves various problems associated with current ballast water treatment methods:
(1) Treatment efficiency (treatment at lower flow rates—reduced controlled disinfection levels due to flow rates and continuous monitoring, lower power usage, reduced/optimal chemical additive required);
(2) Assurance of compliance prior to entering port and discharging; and
(3) Operational problems surrounding high flow rate/high filtration levels are removed.

Advantages of the Present Invention Include the Following:
(1) The technique according to the present invention will not alter flow rates, so as to address the problem associated with variation to the existing designed ballasting flow rate due to additional piping restriction.
(2) The technique according to the present invention will not alter flow rates, so as to address the problem associated with variation to flow rate due to additional components being added e.g. UV, Ozone, and Electro Chemical reactors/injection systems.
(3) The technique according to the present invention will not alter flow rates, so as to address the problem associated with systems requiring additional filtration (reduction in flow—required pressure differential for backwash, downtime due to backwash cycles).
(4) The technique according to the present invention is tolerant to varying water quality, so as to address the problem associated with the systems that are required to treat/disinfect at the same potentially high flow rates of the ship's existing ballast pumps which offers potential problems of fast changing water quality conditions (e.g. sediment may pass through filters) and change in water quality due to flotation levels of the ship (ballasting in tidal waters).

(5) The technique according to the present invention will independently monitor, check and adjust water quality in the ballast tank to ensure compliance, so as to address the problem associated with, or due to, the varying water qualities and flow rate, disinfection techniques that are not able to vary the required treatment dosing levels instantaneously to achieve compliant disinfection levels.

(6) The technique according to the present invention will monitor disinfection/chemical saturation together with PH levels and adjust treatment dosage or advise of neutralization action required, so as to address the problem associated with some treatment systems due to the by-products produced and lack of control due to flow rate may incur other associated problems (corrosion due to uncontrolled PH levels and/or high levels of unrequired toxicity).

(7) The technique according to the present invention has for a comparative flow rate a lower instantaneous power requirement, so as to address the problem associated with the electrical power requirements of existing disinfection systems treating very high flow rates can be prohibitive to fitting to all types of ships (especially retro-fit where existing generating capacity may be a limiting factor).

(8) The technique according to the present invention is constantly monitoring disinfection levels and actual living cell count within the water to add chemicals to the absolute minimum to achieve compliant disinfection levels, such that chemical addition is not normally by a recirculating method (recirculating increases mixing/dispersal within the tank for more effective), so as to address the problem associated with these systems that require the amount of disinfection chemicals to be added to the tank based on water volume (not on water quality).

Examples of Particular Embodiments

According to some embodiments, the present invention may take the form of apparatus, e.g., that may include a signal processor or signal processing module configured to:
receive signaling containing information about the quality of water in a ballast water tank recirculation treatment system; and
determine information about a variable fluorescence treatment to the water in the ballast water tank recirculation treatment system, based at least partly on the signaling received.

Embodiments of the present invention may also include one or more of the following features:

The signal processor or signal processing module may be configured to provide corresponding signaling, e.g., including control signaling, containing information about the variable fluorescence treatment.

The apparatus may include at least one variable fluorescence device configured to receive the corresponding signaling and provide the variable fluorescence treatment, including providing ultraviolet (UV) light to the water in the ballast water tank recirculation treatment system.

The at least one variable fluorescence device may be configured to provide the UV light to water flowing from a ballast tank to a UV chamber.

The at least one variable fluorescence device may be configured to provide the UV light to water flowing from a UV chamber to a ballast tank.

The at least one variable fluorescence device may include two variable fluorescence devices, including one variable fluorescence device configured to provide the UV light to water flowing from a ballast tank to a UV chamber, and/or another variable fluorescence device configured to provide the UV light to water flowing from the UV chamber to the ballast tank.

The at least one variable fluorescence device may be configured to provide UV light targeting eukaryotic algae and/or cyanobacteria.

The signaling may contain information about eukaryotic algae and cyanobacteria contained in the water.

The apparatus may include a control device or controller having the signal processor or signal processing module forming a part thereof.

The signal processor or signal processing module may be configured to receive the signaling containing information about the quality of water in the ballast water tank recirculation treatment system from a sensor or probe, e.g., including a UV sensor or probe. The apparatus may include the UV sensor or probe.

The UV sensor or probe may be configured in relation to a UV chamber that receives the water in the ballast water tank recirculation treatment system. The apparatus may include the UV chamber.

The apparatus may include a dispensing pump configured to circulate the water in the ballast water tank recirculation treatment system.

The apparatus may include the ballast water tank recirculation treatment system that includes: a ballast tank configured to contain the water; a first variable fluorescence device configured to receive water from the ballast tank and provide UV light to the water; a UV chamber configured to receive UV treated water from the first variable fluorescence device; and a second variable fluorescence device configured to receive water from the UV chamber, provide further UV light to the water and also to provide further UV treated water to the ballast tank.

The dispensing pump may be configured to circulate the water from the ballast tank to the first variable fluorescence device, from the first variable fluorescence device to the UV chamber, from the UV chamber to the second variable fluorescence device, and from the second variable fluorescence device back to the ballast tank.

The signaling may contain information about some combination of characteristics about the water, as follows: the temperature, fluorescent dissolved organic matte (fDOM), and/or turbidity. The apparatus may include sensors or probes configured to sense information about the combination of the characteristics about the water, as follows: a temperature sensor, an fDOM sensor, and/or a turbidity sensor, e.g. in relation to the UV chamber.

The apparatus may include a UV power control unit and at least one variable fluorescence device; the signal processor or signal processing module may be configured to provide the corresponding signaling to the UV power control unit; and the UV power control unit may be configured to receive the corresponding signaling and provide UV power control unit signaling to the at least one variable fluorescence device that provides the variable fluorescence treatment, e.g., including providing UV light to the water in the ballast water tank recirculation treatment system.

The UV power control unit may be configured to provide some combination of a seamless VF and UV integration, reduced UV power consumption dependent on water quality, unified data logging of treatment plant and discharge water quality, and complete system runs self test prior to main ballast start up.

The UV power control unit may be configured to optimize the power consumption of the at least one variable fluorescence device so as to benefit fuel consumption and/or system component wear.

The apparatus may include a control enclosure and a flow cell and optic block. The flow cell and optic block may be configured to receive the water from the at least one variable fluorescence device, sense characteristics of the water related to at least water quality and flow rate, and provide flow cell and optic block signaling containing information about at least the water quality and flow rate sensed. The control enclosure may be configured to receive the flow cell and optic block signaling and provide the corresponding signaling to the UV power control unit, based at least partly on the flow cell and optic block signaling received.

The ballast water tank recirculation treatment system may be configured on, or form part of, a vessel, boat or ship.

BRIEF DESCRIPTION OF THE DRAWING

The drawing includes the following Figures, not necessarily drawn to scale:

FIG. 1b shows a typical 300,000 DWT VLCC ballast water tank arrangement and capacities.

FIG. 1c shows an example flow requirement of a recirculation system, e.g., having treatments flow rates per tank that may be dramatically reduced.

FIG. 3 shows a block diagram of a signal processor or signal processing module that may form part of the control device of the apparatus shown in FIG. 2, according to some embodiments of the present invention.

Figure 1A:
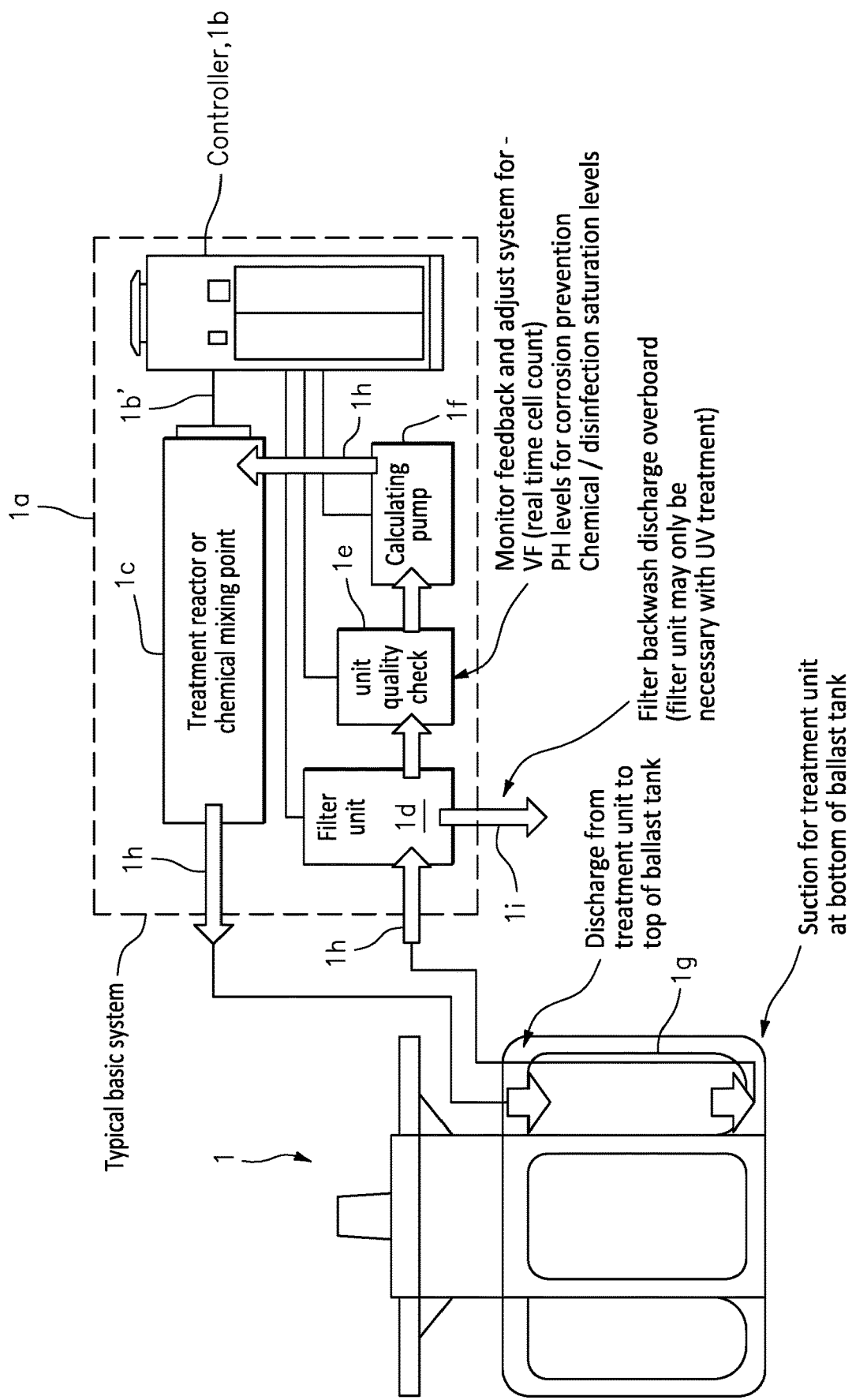
FIG. 1a shows a typical basic ballast water tank treatment system, e.g., which may be adapted according to some embodiments of the present invention.

In the following description of the exemplary embodiment, reference is made to the accompanying Figures in the drawing, which form a part hereof, and in which are shown by way of illustration of an embodiment in which the invention may be practiced. It is to be understood that other embodiments may be utilized, as structural and operational changes may be made without departing from the scope of the present invention.

DETAILED DESCRIPTION OF THE INVENTION

Figure 2:
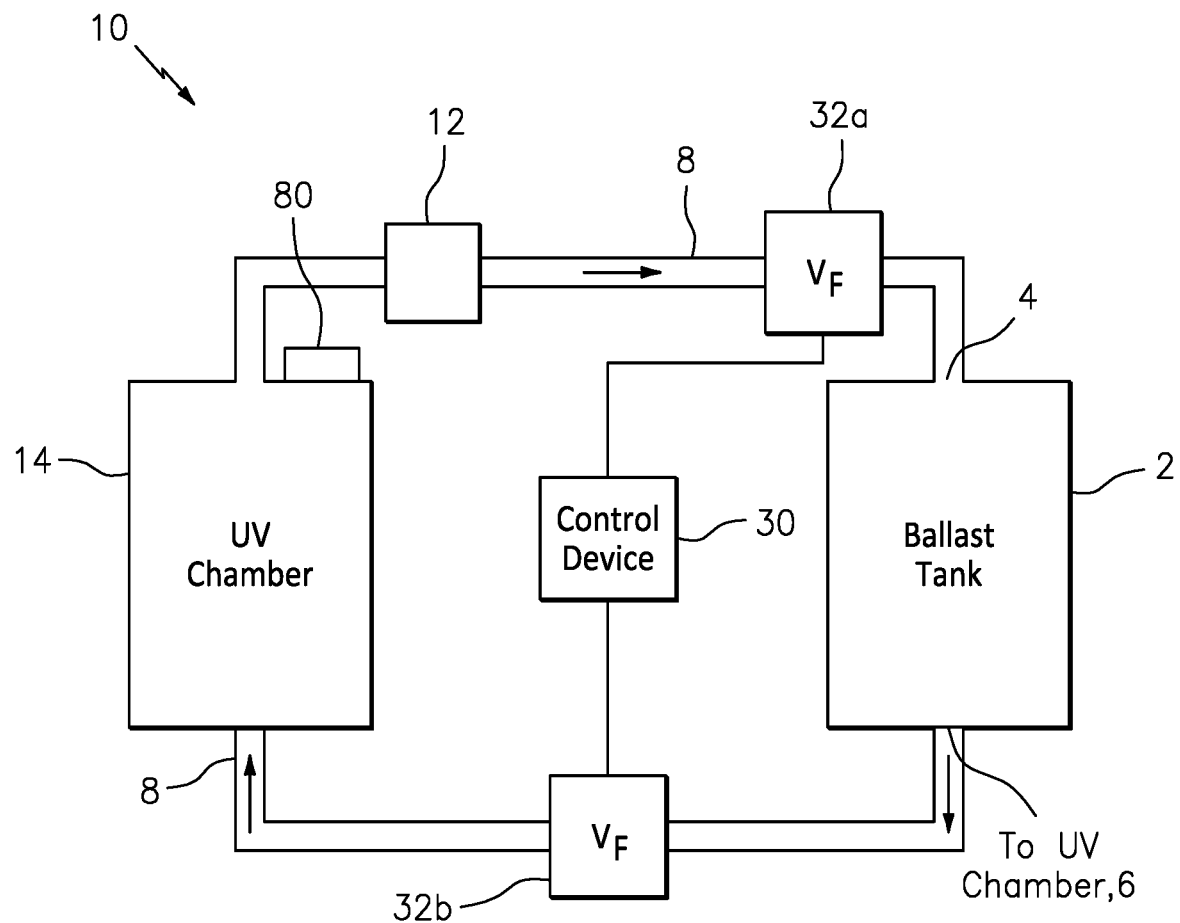
FIG. 2 shows a block diagram of apparatus in the form of a ballast water tank recirculation treatment system having a control device, e.g., that may be implemented in a vessel, according to some embodiments of the present invention.

FIGS. 1a, 2-3

By way of example, FIG. 2 shows apparatus generally indicated as 10 in the form of a ballast water tank recirculation treatment system, according to some embodiments of the present invention. The ballast water tank recirculation treatment system includes, e.g., an arrangement having a ballast tank 2, a transfer pipe 8, a dispensing pump 12, a UV chamber 14, a UV probe 80 together with two variable fluorescence device (VF1, VF1) 32a, 32b, and a control device 30 for providing control signaling to the VF devices 32a, 32b, which may be implemented according to some embodiments of the present invention. Consistent with that shown in FIG. 2, the control device 30 may be configured to receive suitable signaling from the UV chamber 14 and/or the VF devices 32a, 32b in order to determine the needed control or corresponding signaling to be provided. The control device 30 may also receive other signaling from other devices, like sensors, etc., consistent with that shown and described herein.

According to some embodiments, the control device 30 may include, or take the form of, a signal processor or signal processing module 10a configured to:
  receive signaling containing information about the quality of water in the ballast water tank recirculation treatment system; and
  determine information about a variable fluorescence treatment to the water in the ballast water tank recirculation treatment system, based at least partly on the signaling received.

The signal processor or signal processing module 10a may be configured to provide corresponding signaling containing information about the variable fluorescence treatment, including control signaling for implementing the variable fluorescence treatment with the VF devices 32a, 32b.

According to some embodiments of the present invention, the apparatus 10 may include at least one of the variable fluorescence devices 32a, 32b configured to receive the corresponding signaling and provide the variable fluorescence treatment, e.g., including providing ultraviolet (UV) light to the water in the ballast water tank recirculation treatment system. The at least one variable fluorescence device may be configured in the form of a VF 32b to provide the UV light to water flowing from the ballast tank 2 to the UV chamber 14, as shown in FIG. 2. The at least one variable fluorescence device may also be configured in the form of a VF 32a to provide the UV light to water flowing from the UV chamber 14 to the ballast tank 2. According to some embodiments of the present invention, the at least one variable fluorescence device may include both variable fluorescence devices 32a, 32b. As a person skilled in the art would appreciate and understand, some part of the light emitted from fluorescent devices and/or lamps is understood to be UV light. Variable fluorescence devices like element 32a, 32b are known in the art, and the scope of the invention is not intended to be limited to any particular type or kind thereof, either now known or later developed in the future.

By way of example, the at least one variable fluorescence device 32a, 32b may be configured to provide UV light targeting eukaryotic algae and cyanobacteria, as well as other algae and/or bacteria either now known, later developed or later recognized to be a problem in the future. The scope of the invention is also intended to include sensors or probes being implemented or arrangement in other places or location that that disclosed herein, e.g., including in other parts of the piping circulating the water.

The signaling received by the signal processor 10a, e.g., from sensors or probes like element 80, may contain information about eukaryotic algae and cyanobacteria contained in the water, e.g., in the UV chamber 14. The apparatus 10 may include the UV probe 80, according to some embodiments of the present invention. Probes like element 80 and UV chamber like element 14 are known in the art, and the scope of the invention is not intended to be limited to any particular type or kind thereof, either now known or later developed in the future.

According to some embodiments of the present invention, the control device or controller 30 may include, or take the form of, the signal processor or signal processing module 10a. Consistent with that disclosed herein, the signal processor or signal processing module 10a may be configured to receive the signaling containing information about the quality of water in the ballast water tank recirculation treatment system, e.g., from the UV probe 80 or other sensor.

The UV probe 80 may be configured in relation to the UV chamber 14 that receives the water in the ballast water tank recirculation treatment system.

The dispensing pump 12 may be configured to circulate the water in the ballast water tank recirculation treatment system. Pumps like element 12 are known in the art, and the scope of the invention is not intended to be limited to any particular type or kind thereof, either now known or later developed in the future.

The apparatus may include, or take the form of, the ballast water tank recirculation treatment system itself, e.g., that includes: the ballast tank 2 configured to contain the water; the first variable fluorescence device 32b configured to receive water from the ballast tank 2 and provide UV light to the water; the UV chamber 14 configured to receive UV treated water from the first variable fluorescence device 32b; and the second variable fluorescence device 32a configured to receive water from the UV chamber 14, provide further UV light to the water and also to provide further UV treated water to the ballast tank 2.

The dispensing pump 12 may be configured to circulate the water from the ballast tank 2 to the first variable fluorescence device 32b, from the first variable fluorescence device 32b to the UV chamber 14, from the UV chamber 14 to the second variable fluorescence device 32a, and from the second variable fluorescence device 32a back to the ballast tank 2.

The signaling received by the control device 30 may also contain information about some combination of characteristics about the water, as follows: the temperature, fluorescent dissolved organic matte (fDOM), and/or turbidity.

The apparatus may include sensors or probes configured to sense information about the combination of the characteristics about the water, as follows: a temperature sensor, an fDOM sensor, and/or a turbidity sensor, which may all be configured as part of the sensor indicated by reference numeral 80.

FIG. 1a shows a vessel generally indicated as 1 having a typical basic ballast water tank treatment system 1a configured on-board, e.g., having a controller 1b, a treatment reactor or chemical mixing point 1c, a filter unit 1d, a water quality check module 1e and a circulating pump 1f, that form part of a vessel 1 and are arranged in relation to a ballast tank 1g via piping 1h. The treatment reactor or chemical mixing point 1c may be adapted according to some embodiments of the present invention, e.g., so as to include at least one variable fluorescence devices like elements 32a, 32b configured to operate consistent with that disclosed herein in response associated signaling received from the controller 1b along line 1b', as shown. In addition to that set forth herein, the water quality check module 1e may be configured, e.g., to monitor real time cell count, pH levels for corrosion prevention, and chemical/disinfection saturation levels. In operation, discharge from the treatment reactor or chemical mixing point 1c is provided to the top of the ballast tank 1g, and the ballast tank 1g is configured with a suction device for providing the water from the ballast tank 1g to the treatment reactor or chemical mixing point 1c. The basic ballast water tank treatment system 1a may also be configured to provide filter backwash discharge overboard via piping 1i.

FIGS. 4-5

Figure 4:
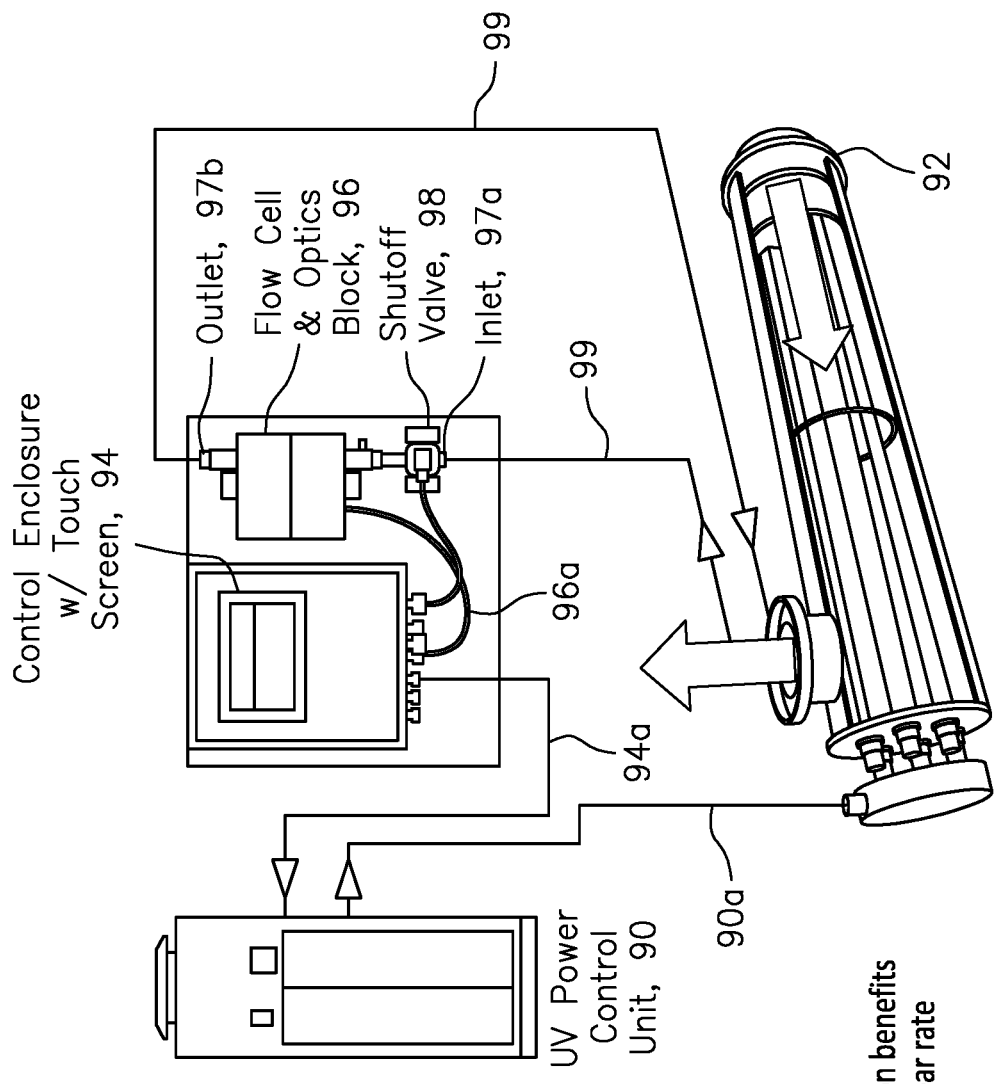
FIG. 4 shows a VF discharge monitor arrangement with a UV power control, which may be implemented according to some embodiments of the present invention.

By way of further example, and consistent with that shown in FIG. 4 the apparatus may include a UV power control unit 90 and at least one variable fluorescence device 92. The signal processor or signal processing module may be configured to provide the corresponding signaling along line 90a to the UV power control unit 90; and the UV power control unit 90 may be configured to receive the corresponding signaling and provide UV power control unit signaling to the at least one variable fluorescence device 92 that provides the variable fluorescence treatment, e.g., including providing UV light to the water in the ballast water tank recirculation treatment system.

The UV power control unit 90 may be configured to provide some combination of a seamless VF and UV integration, reduced UV power consumption dependent on water quality, unified data logging of treatment plant and discharge water quality, and complete system runs self test prior to main ballast start up, consistent with that shown in FIG. 4. A person skilled in the art would appreciate and understand how to configure the UV power control unit 90 in order to implement such functionality, consistent with that disclosed herein. For example, fluorescence devices like elements 32a, 32b and 92 are understood to operate using very low power consumption, especially if used, controlled and turned on so as to operate for providing such UV signaling only when needed to treat the water. Based on this, the UV power control unit 90 may also be configured so as to optimize the power consumption of the at least one variable fluorescence device 92, 32a or 32b, so as to benefit fuel consumption and/or system component wear of the underlying ballast water tank recirculation treatment system.

According to some embodiments of the present invention, the apparatus may include a control enclosure 94 and a flow cell and optic block 96. The flow cell and optic block 96 may be configured to receive the water from the at least one variable fluorescence device 92, sense characteristics of the water related to at least water quality and flow rate, and provide flow cell and optic block signaling to the control enclosure 94 along line 96a containing information about at least the water quality and flow rate sensed. The control enclosure 94 may be configured to receive the flow cell and optic block signaling and provide the corresponding signaling along line 94a to the UV power control unit 90, based at least partly on the flow cell and optic block signaling received.

The system shown in FIG. 4 also includes an inlet 97a and an outlet 97b to and from the flowcell and optics block 96, a shutoff valve 98 for shutting off the flow of the water, and suitable piping 99 for receiving and providing the water between the flowcell and optics block 96 and the fluorescence device 92, as shown.

The ballast water tank recirculation treatment system may be configured on, or forms part of, a vessel or ship, etc., so as to provide a compact energy efficient treatment arrangement or system that may work alone or in conjunction with a pre-existing water treatment on-board, e.g., the vessel, board or ship.

According to some embodiments, the present invention may incorporate, and be based at least partly on, the use of the aforementioned high quality variable fluorescence technology, e.g., sensing and providing data on cell viability and number, with additional sensing and algorithms to address the most challenging conditions that can negatively impact the variable fluorescence data quality. The technology according to the present invention may be applied, and is particularly important to, e.g., a ballast discharge application and provides a solution to address problems due to, or associated with, the potentially expensive and time consuming consequences of inaccurate discharge data creating a false positive or false negative result that plague systems are known in the art.

By way of example, optical sensors used to sense various water quality parameters in natural water may address a number of challenging conditions. These include, but are not limited to; variations in temperature, dissolved organic matter, turbidity, and bio-fouling. Specific to chlorophyll fluorescence measurements, such as variable fluorescence, an accurate system may address cyanobacteria. Cyanobacteria are understood to be photosynthetic organisms that contain chlorophyll a, but do not provide a fluorescent signal using optics optimized for chlorophyll a resulting from differences in cell packaging of chlorophyll, presence of phycobilin accessory pigments, and other differences from eukaryotic algae. Cyanobacteria often compose a significant portion of the photosynthetic plankton community in coastal areas, where ballast water is typically pulled or drawn from, and not sensing this class of organism can result in significant underestimates of algae biomass. The present invention may be configured to integrate temperature, fDOM (fluorescent Dissolved Organic Matter), and turbidity sensors, as well as two variable fluorescence channels targeting eukaryotic algae and cyanobacteria. Data from the sensors or probes may be processed in an algorithm, consistent with that disclosed herein, that may calculate or determine an extremely accurate estimate of the ballast water discharge quality and will indicate to users if the discharge is above or below the discharge limit. The scope of the invention is not intended to be limited to any particular type, kind or number associated with the discharge limit, e.g., which may vary or depend of the particular application.

Figure 5:
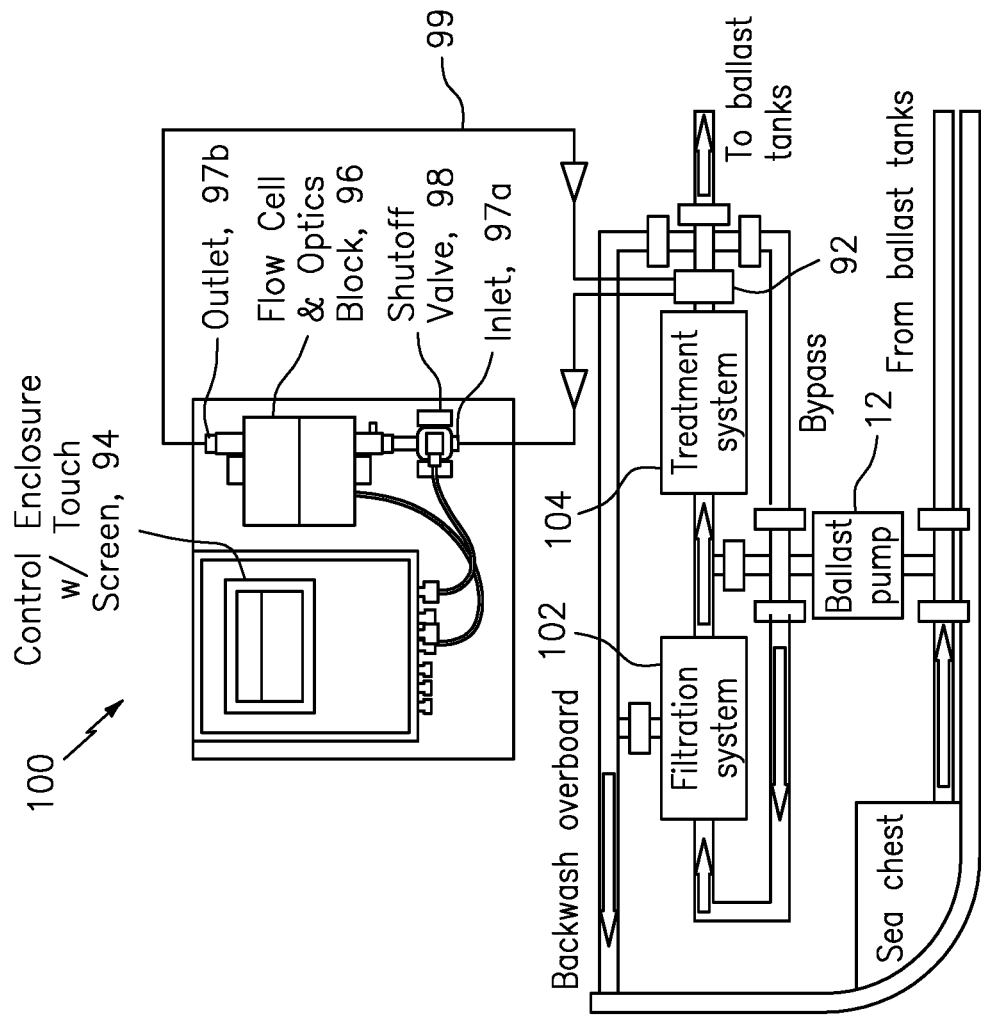
FIG. 5 shows a VF discharge monitor arrangement, which may be implemented according to some embodiments of the present invention.

FIG. 5 shows a VF discharge monitoring system 100 that is indicated as, and embodies, the United States Coast Guard preferred compliance testing method or technique. Similar elements in FIGS. 4-5 are referred to be similar reference numerals. The VF discharge monitoring system 100 includes a filtration system 102 and a treatment system 104 arranged in relation to at least one VF device 92.

The Signal Processor or Signal Processing Module 10a

By way of example, and consistent with that described herein, the functionality of the signal processor or signal processing module 10a may be implemented using hardware, software, firmware, or a combination thereof, although the scope of the invention is not intended to be limited to any particular embodiment thereof. In a typical software implementation, the signal processor would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality set forth in the signal processing block 10a, such as receiving signaling containing information about the quality of water in a ballast water tank recirculation treatment system, and determining information about a variable fluorescence treatment to the water in the ballast water tank recirculation treatment system, based at least partly on the signaling received, as well as other functionality described herein without undue experimentation.

The scope of the invention is not intended to be limited to any particular implementation using technology now known or later developed in the future. Moreover, the scope of the invention is intended to include the signal processor being a stand alone module, as shown, or in the combination with other circuitry for implementing another module.

It is also understood that the apparatus 10 may include one or more other modules, components, circuits, or circuitry 10b for implementing other functionality associated with the apparatus that does not form part of the underlying invention, and thus is not described in detail herein. By way of example, the one or more other modules, components, circuits, or circuitry 10b may include random access memory, read only memory, input/output circuitry and data and address buses for use in relation to implementing the signal processing functionality of the signal processor 10a, or devices or components related to the ballast water tank recirculation treatment system, e.g., in a vessel, boat or ship.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What we claim is:

1. A ballast water tank recirculation treatment system for treating ballast water on a vessel, comprising:
    a ballast tank configured to contain ballast water;
    a UV chamber being coupled to the ballast tank via transfer piping for receiving the ballast water;
    a pump configured to dispense the ballast water to and from the ballast tank and the UV chamber via the transfer piping;
    a UV probe coupled to the UV chamber, configured to sense the presence of bacteria or algae in the ballast water received in the UV chamber, and provide sensed signaling containing information about the presence of bacteria or algae sensed in the ballast water in the UV chamber;
    at least one variable fluorescence device coupled to the transfer piping, configured to receive control signaling and provide variable ultraviolet (UV) light targeting the bacteria or algae present in the ballast water flowing in the transfer piping, based upon the control signaling received; and
    a control device or controller having a signal processor or signal processing module configured to:
        receive and store the sensed signaling; and
        determine and provide the control signaling containing information about a variable fluorescence treatment that provides the variable ultraviolet (UV) light for targeting and controlling the bacteria or algae present in the ballast water flowing in the ballast water tank recirculation treatment system, based at least partly on the sensed signaling received and stored.

2. A ballast water tank recirculation treatment system, according to claim 1, wherein the at least one variable fluorescence device is coupled to the transfer piping to provide the variable ultraviolet (UV) light targeting the bacteria or algae present in the ballast water flowing from the UV chamber to the ballast tank.

3. A ballast water tank recirculation treatment system, according to claim 1, wherein the at least one variable fluorescence device comprises two variable fluorescence devices, including one variable fluorescence device configured to provide the UV light targeting the bacteria or algae present in the water flowing from the ballast tank to the UV chamber, and another variable fluorescence device configured to provide the UV light targeting the bacteria or algae present in the water flowing from the UV chamber to the ballast tank.

4. A ballast water tank recirculation treatment system, according to claim 1, wherein the at least one variable fluorescence device is configured to provide the variable UV light targeting eukaryotic algae and/or cyanobacteria in the ballast water.

5. A ballast water tank recirculation treatment system, according to claim 4, wherein
the sensed signaling contains information about the eukaryotic algae and the cyanobacteria contained in the ballast water; and
the signal processor or signal processing module provides the control signaling to the at least one variable fluorescence device for provisioning the variable UV light for targeting and controlling the eukaryotic algae and/or cyanobacteria in the ballast water.

6. A ballast water tank recirculation treatment system, according to claim 1, wherein the sensed signaling also contains information about some combination of characteristics about the ballast water, including as follows:
the temperature,
a fluorescent dissolved organic matter (fDOM), and/or turbidity.

7. A ballast water tank recirculation treatment system, according to claim 6, wherein the ballast water tank recirculation treatment system comprises sensors configured to sense information about the combination of the characteristics about the ballast water, as follows:
a temperature sensor configured to sense the temperature of the ballast water,
an fDOM sensor configured to sense the fDOM of the ballast water, and/or
a turbidity sensor configured to sense the turbidity of the ballast water.

8. A ballast water tank recirculation treatment system, according to claim 1, wherein
the ballast water tank recirculation treatment system comprises a control enclosure and a flow cell and optic block;
the flow cell and optic block is configured to receive the ballast water from the at least one variable fluorescence device, sense characteristics of the ballast water related to at least the water and flow rate, and provide flow cell and optic block signaling containing information about at least the water and flow rate sensed; and
the control enclosure is configured to receive the flow cell and optic block signaling and provide the control enclosure signaling to the control device or controller, based at least partly on the flow cell and optic block signaling received.

9. A ballast water tank recirculation treatment system, according to claim 1, wherein the ballast water tank recirculation treatment system is configured on, or forms part of, the vessel.

* * * * *